United States Patent [19]

Tepley

[11] Patent Number: 4,897,924
[45] Date of Patent: Feb. 6, 1990

[54] HAND MEASUREMENT APPARATUS
[75] Inventor: George T. Tepley, Chattanooga, Tenn.
[73] Assignee: TGC Corporation, Chattanooga, Tenn.
[21] Appl. No.: 233,951
[22] Filed: Aug. 19, 1988
[51] Int. Cl.[4] .............................................. A41H 1/02
[52] U.S. Cl. ........................................ 33/2 R; 33/512
[58] Field of Search ............. 33/511, 512, 2 R, 3 A, 33/3 R, 551, 552, 175

[56] References Cited

U.S. PATENT DOCUMENTS

| | | | |
|---|---|---|---|
| 1,997,920 | 4/1935 | Bliss | 33/2 R |
| 2,176,288 | 10/1939 | Baird et al. | 33/2 R |
| 3,945,122 | 3/1976 | Durand et al. | 33/512 X |
| 4,173,074 | 11/1979 | Newman et al. | 33/512 X |

*Primary Examiner*—Harry N. Haroian
*Attorney, Agent, or Firm*—Berman, Aisenberg & Platt

[57] ABSTRACT

Apparatus for measuring dimensions of a human hand for use in making custom-sized gloves includes a plate for supporting the hand in outstretched position and movable markers extending through the plate for locating points on the perimeter of the hand. The position of the markers is recorded on a sheet. The maximum thickness of the hand may be measured by a scale extending from the apparatus.

19 Claims, 6 Drawing Sheets

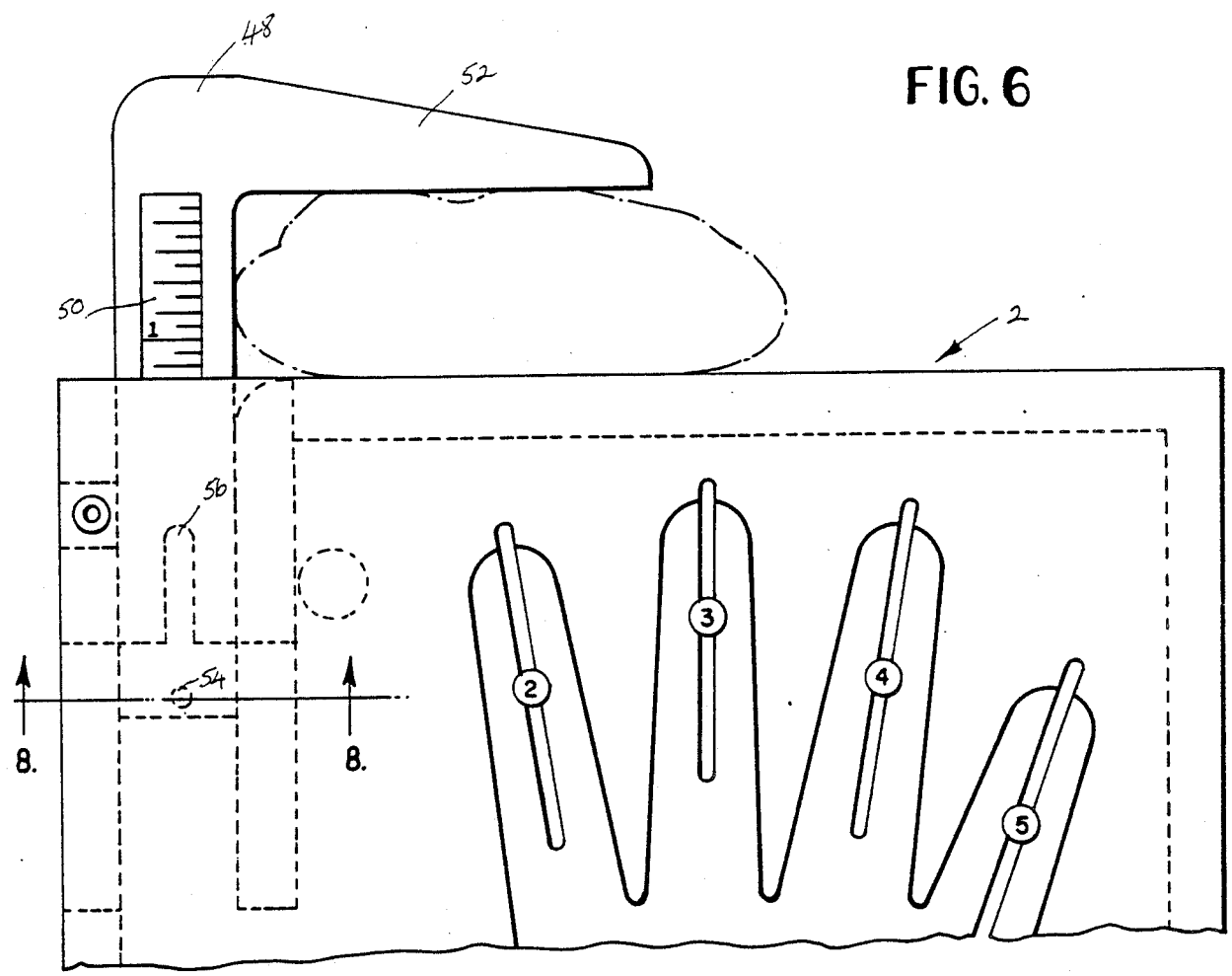
FIG. 6
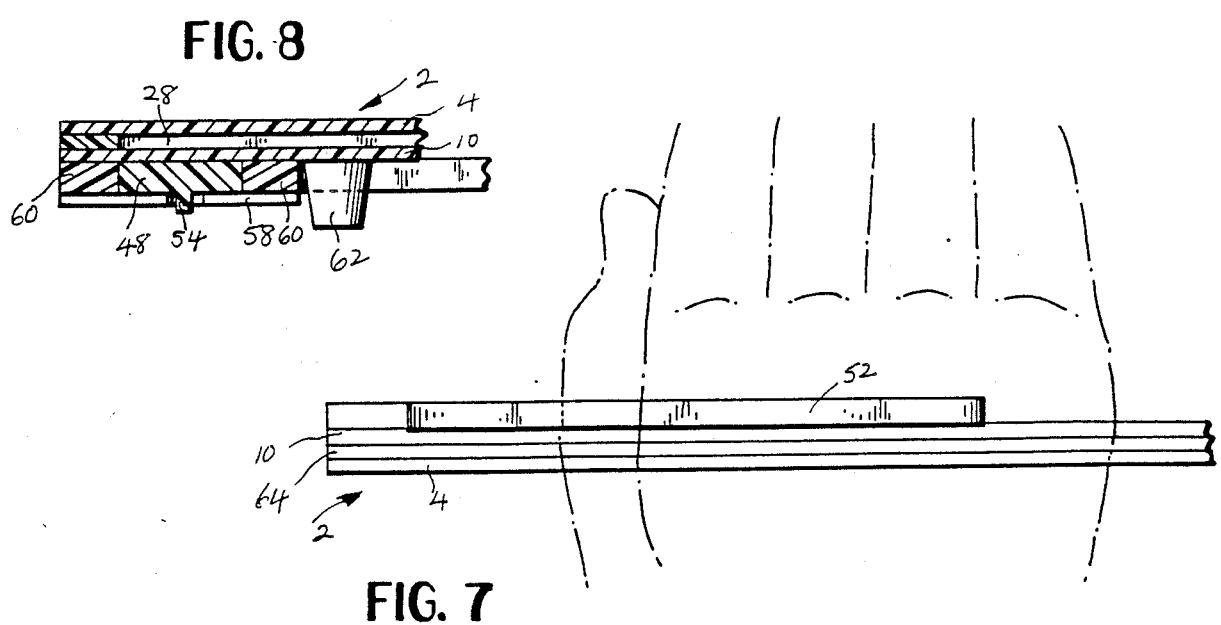
FIG. 8
FIG. 7

HAND MEASUREMENT APPARATUS

FIELD OF THE INVENTION

This invention relates to apparatus for measuring dimensions of a human hand for custom fitted glove manufacture.

BACKGROUND OF THE INVENTION

Regularly sized gloves do not accommodate a user having an unusually sized hand, such as a hand which is exceptionally well-developed due to long practice of an art, craft or sport, or a hand which is deformed. Known hand measuring scales correlate hand size to ready made glove size, and do not measure the dimensions necessary to provide a well-fitting glove, custom cut for the particular hand measured.

Davis, Jr., U.S. Pat. No. 2,146,799, describes a hand measurement scale which correlates to known glove sizes. No individual measurements are taken for providing a custom glove. Baird, U.S. Pat. No. 2,176,288, describes a similar apparatus, also correlated to standard glove sizes. Neither of these patents describes an instrument from which individual hand measurements are taken for translating into dimensions for making a custom glove.

Clarke, U.S. Pat. No. 2,605,548, describes an apparatus for measuring a human hand which is also correlated to traditional glove sizing. The device only measures the length and width of the hand and the length of the middle finger. The device of Newman, U.S. Pat. No. 4,174,074, is directed toward a device for measuring the length of a middle finger and palm width, also for coordinating with sizes of ready-manufactured gloves. The Montgomery patent, U.S. Pat. No. 4,360,972, also concerns selecting a ready-made glove, particularly a glove adapted to be used for hand injuries such as burns.

SUMMARY OF THE INVENTION

Apparatus for measuring a human hand is described in which multiple measurements of the hand are taken, these dimensions being necessary for cutting a glove exactly sized for the hand measured. A hand is placed on a flat, horizontal surface of the apparatus, in relaxed, outstretched position, and locating markers are moved to critical positions on the perimeter of the hand. The location of each of the markers, as positioned on the perimeter of the hand, is recorded and the positions of the locating markers are translated into dimensions of a glove pattern.

A further measurement of the hand is taken by extending a scale to measure the thickness of the hand. This measurement is particularly important for an artisan or sportsman who may have certain hand muscles unusually well developed through constant use.

It is an object of the invention to provide a hand measurement apparatus for obtaining dimensions for use in the manufacture of custom-fitted gloves.

It is a further object of the invention to provide a hand measurement apparatus for measuring the thickness of the hand in addition to marking positions adjacent the perimeter of the hand.

It is another object of the invention to provide a hand measurement apparatus in which the measurements are recorded on a sheet of paper.

BRIEF DESCRIPTION OF THE DRAWINGS

FIG. 6 is a front elevational view, partly cut away, showing the apparatus in use for measuring the thickness of a hand.

FIG. 7 is a top view of the apparatus in use, as shown in FIG. 6.

FIG. 8 is a sectional view taken on line 8—8 of FIG. 6.

DETAILED DESCRIPTION OF THE INVENTION

The hand measurement apparatus of the invention records critical dimensions of a hand for use in making custom-sized gloves. The measurements are not related to traditional glove sizes but are related to dimensions of certain portions of a hand which are critical in making gloves which properly fit the hand. Persons in certain professions where gloves are needed, such as professional golfers, often find it difficult or impossible to obtain a glove which properly fits the hand. Such persons, who make constant use of certain muscles of the hand which become exceptionally well-developed, may also find it difficult to obtain regular gloves, such as dress gloves or driving gloves, which are comfortable in wear. The apparatus of the invention is useful for measuring all shapes and sizes of hand for sizing custom-fitted gloves. A person having an average hand size may also prefer to wear custom-fitted gloves.

Figure 1:
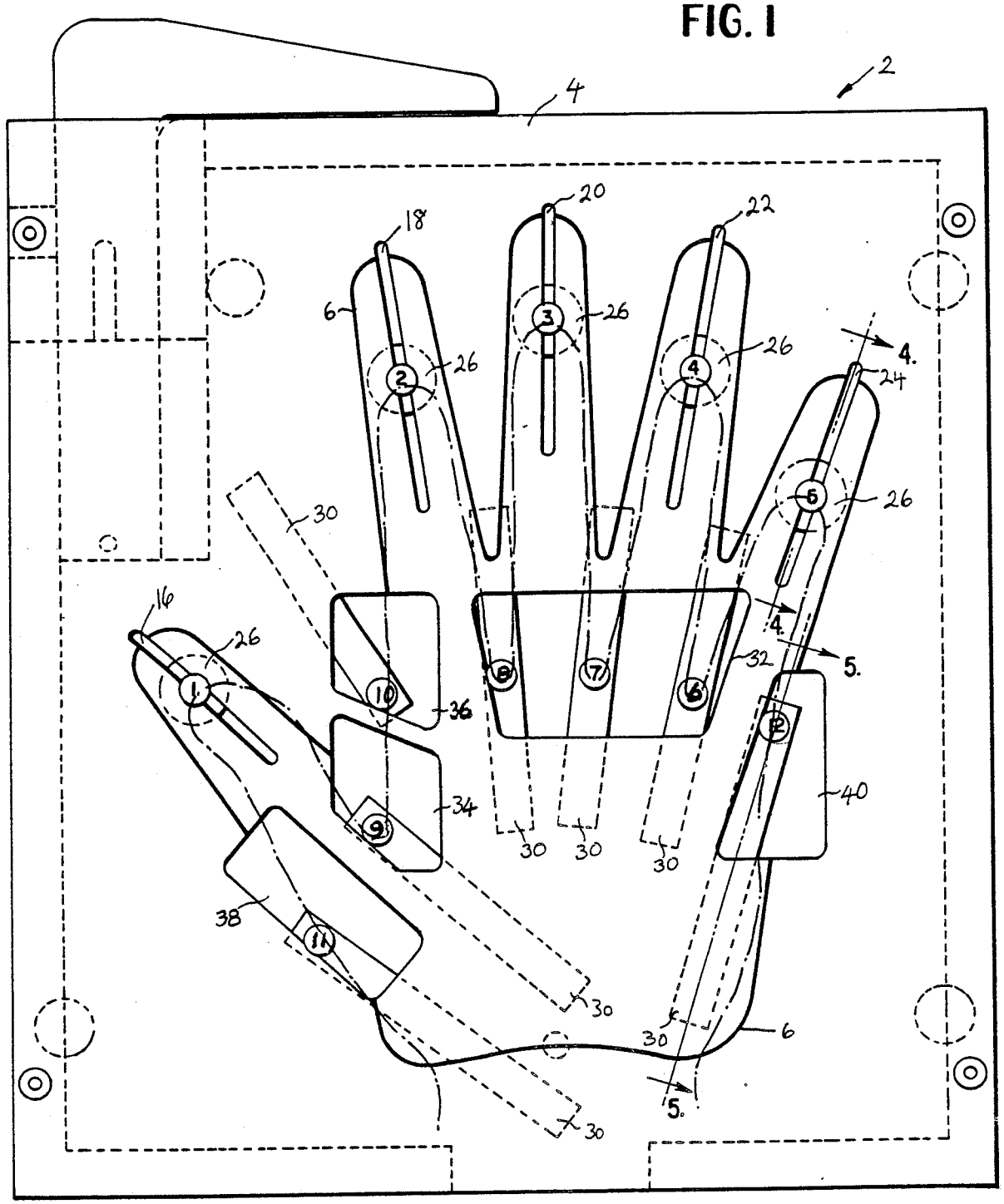
FIG. 1 is a top plan view of apparatus of the invention, showing a hand in place for measurement.
Figure 2:
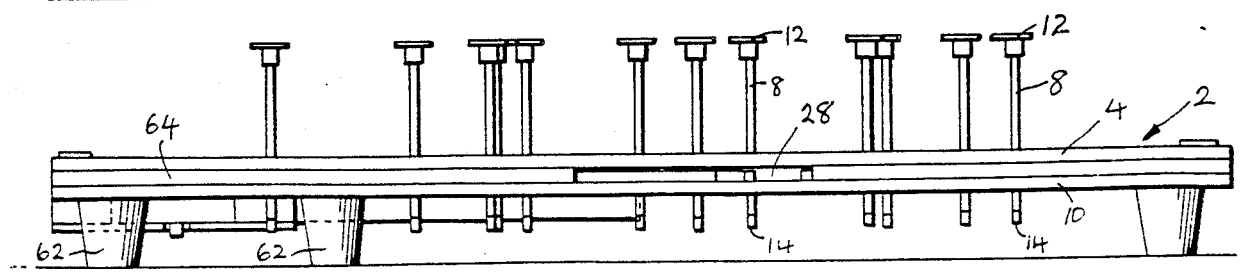
FIG. 2 is an end view of the apparatus of FIG. 1.
Figure 3:
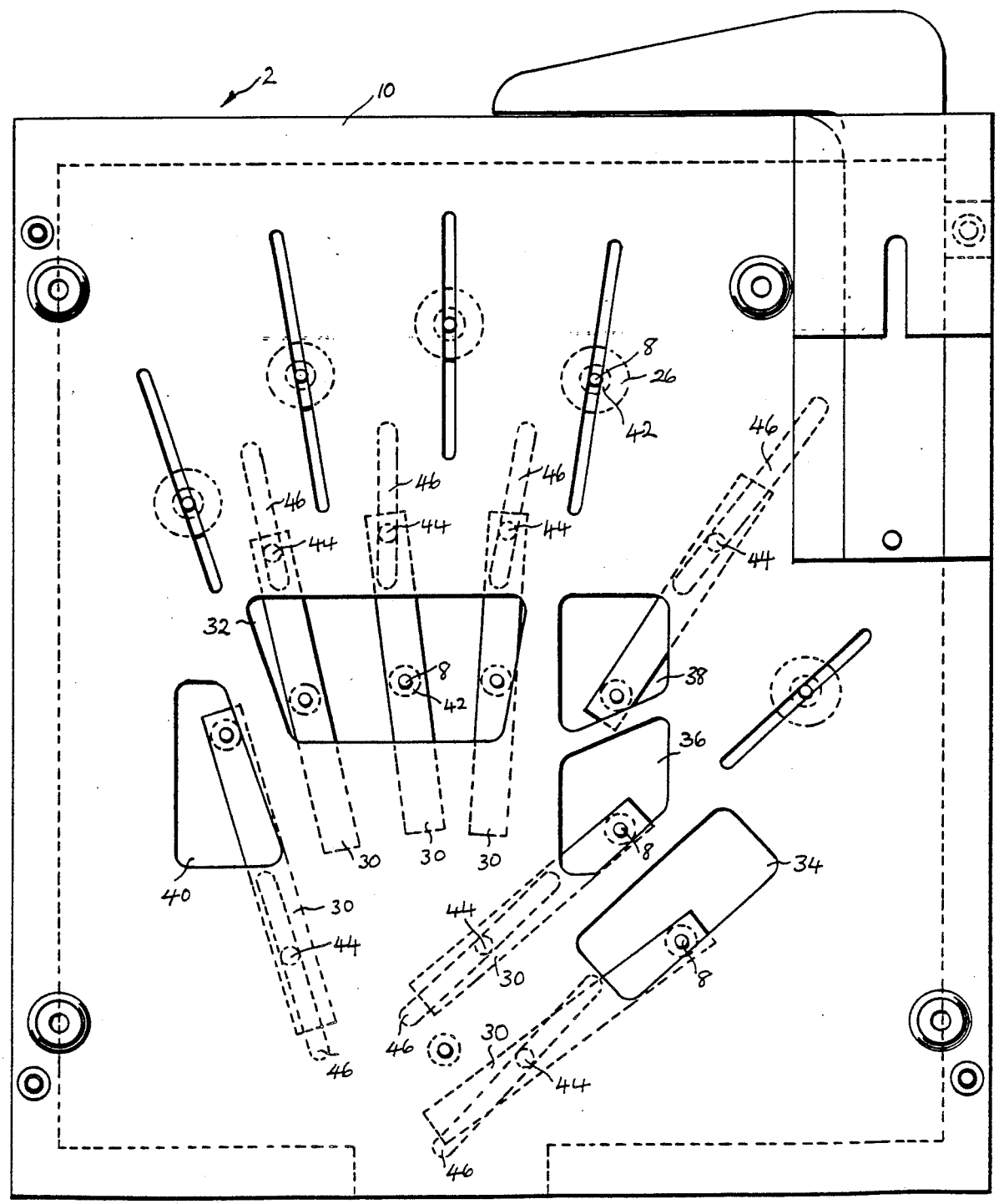
FIG. 3 is a bottom plan view of the apparatus of FIG. 1.

With reference to the Figures, in which like numerals represent like parts, FIG. 1 shows hand measurement apparatus 2 having a hand, shown in phantom, in position for measurement on the surface of top plate 4 of apparatus 2. The approximate position for the hand, on the surface of top plate 4, is shown by outline 6 marked on plate 4. A plurality of pins 8, shown in FIG. 2, protrude through top plate 4 and bottom plate 10 of the device and extend below the bottom plate a sufficient distance for the position of the pins to be recorded. Each pin 8 is marked on its top surface 12 with a numeral, or other indicia, and may have a sharp point, white paint, or other appropriate marking, on its bottom surface 14, as discussed below.

Figure 9:
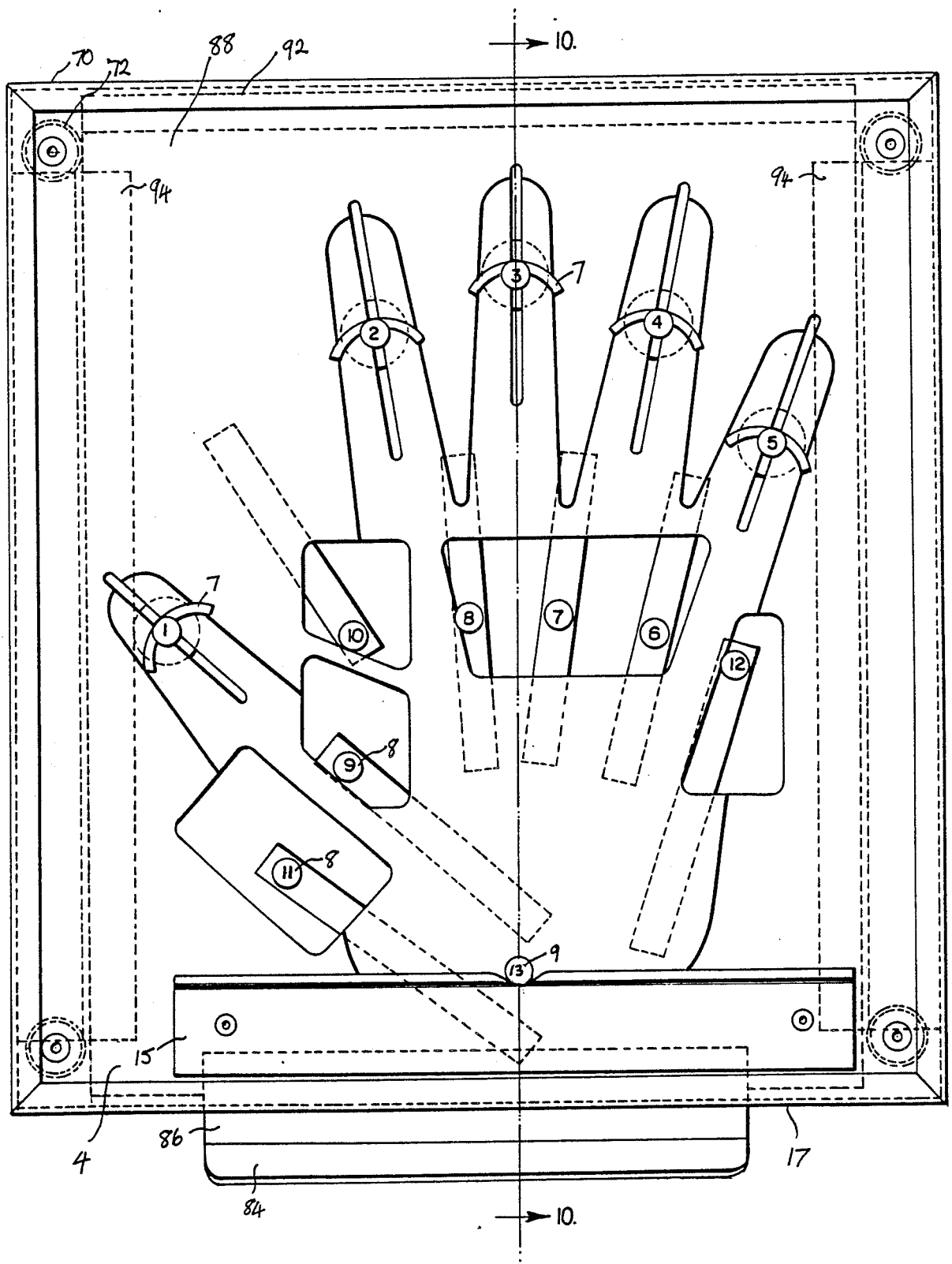
FIG. 9 is a top plan view of another embodiment of apparatus of the invention.

The twelve pins 8, shown in FIG. 1, each have a numeral (1 through 12) marked on top surface 12, and each pin 8 extends both above and below top plate 4. The position of pin 9 is marked on plate 4, but the pin only extends below the plate. Pin 9 indicates a reference point at the base of the hand. A strip 15 of plexiglass or other material may be fastened adjacent pin 9 and parallel to edge 17 of top plate 4 as an aid to proper location of the hand, as shown in FIG. 9.

When a hand is placed on plate 4, pin 8 (marked No. 1) is moved in slot 16 to the end of the thumb being measured. Pin 8 (marked No. 2) is moved in slot 18 to the end of the first (index) finger being measured. Pin 8 (marked No. 3) is moved in slot 20 to the end of the second (middle) finger being measured. Pin 8 (marked No. 4) is moved in slot 22 to the end of the third (ring) further being measured. Pin 8 (marked No. 5) is moved in slot 24 to the end of the fourth (little) finger being measured.

Pins (marked No. 1 through No. 5) indicate the length of the thumb and each finger. Each pin is located at the end of the fingernail, so that the measurement includes the length of the fingernail, thus insuring that the finger of the glove is not cut too short.

Pins (marked Nos. 1 through 5) move in elongated slots 16, 18, 20, 22 and 24, respectively, cut in top plate 4 and bottom plate 10 of the device, and each of these pins is secured in vertical position and passes through a disc 26 which slides in space 28 between top plate 4 and bottom plate 10. Each pin (marked Nos. 1 through 5) moves horizontally in its elongated slot. Disc 26 may be of any appropriate shape which facilitates accurately positioning the pin at the end of the finger. Pins 8 (marked Nos. 1 through 5) may have curved guards optionally attached, for easier location of these pins. Guards 7 are illustrated in FIG. 9.

Pins 8 (marked Nos. 6 through 8) each extend through a strip 30, preferably of translucent material. Each strip 30 slides in space 28 between top plate 4 and bottom plate 10 of apparatus 2. Pins 8 (marked Nos. 6 through 8) each extend vertically through one of these strips, and these pins 8 (marked Nos. 6 through 8) may be moved within the boundaries of shaped aperture 32 through plates 4 and 10. When a hand is positioned on top plate 4 for measurement, pin 8 (marked No. 6) is moved into the crease between and at the base of the third and fourth fingers. Pin 8 (marked No. 7) is moved into the crease between and at the base of the second and third fingers and pin 8 (marked No. 8) is moved into the crease between and at the base of the first and second fingers. Pin 8 (marked No. 9) is moved to the crease marking the lowest point between the thumb and first finger. Each of these pins (marked Nos. 6–9), may have a collar 42, shown in FIG. 10, which may be of any appropriate material, such as rubber or plastic, around the shaft of the pin between top surface 4 and the pin head, for easier location in the required positions.

Pin 8 (marked No. 10) is moved to the outside edge of the first finger, opposite the knuckle on the hand, to measure a diagonal width of the base of the first finger between pins marked Nos. 6 and 10. Likewise, pin 8 (marked No. 12) is moved to the outside perimeter of the little finger, opposite the knuckle on the hand, where the distance between the pins marked No. 6 and No. 12 measures the width of a diagonal base of the little finger. The distance between the pins marked No. 6 and No. 7 measures the width of the base of the third finger, and the distance between the pins marked No. 7 and No. 8 measures the width of the base of the middle finger. The distance between the pins marked No. 10 and No. 12 measures the width of the hand.

The pins marked Nos. 9 through 12 each move on a strip 30, similar to the strips 30 which support pins marked Nos. 6 through 8. Each of the strips 30 which support pins Nos. 9 through 12 moves within the boundaries of its shaped aperture 34, 36, 38 and 40, respectively. Each of the shaped apertures 32 through 40 enables the pins extending therethrough to have a wide range of movement to measure the size of as great a variety of hands as possible.

When the pins are each positioned as described above, the position of each pin is recorded using an indicator, such as a pointed tip or a painted marker, on the lower surface 14 of each pin.

Figure 4:
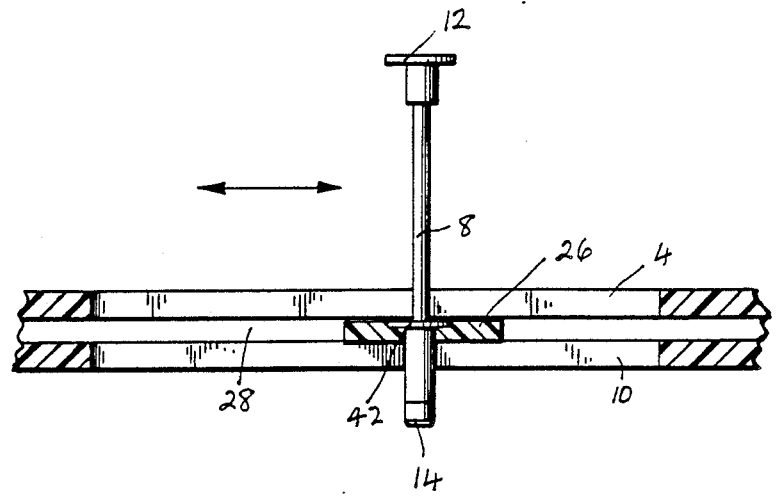
FIG. 4 is a sectional view taken on line 4—4 of FIG. 1.
Figure 5:
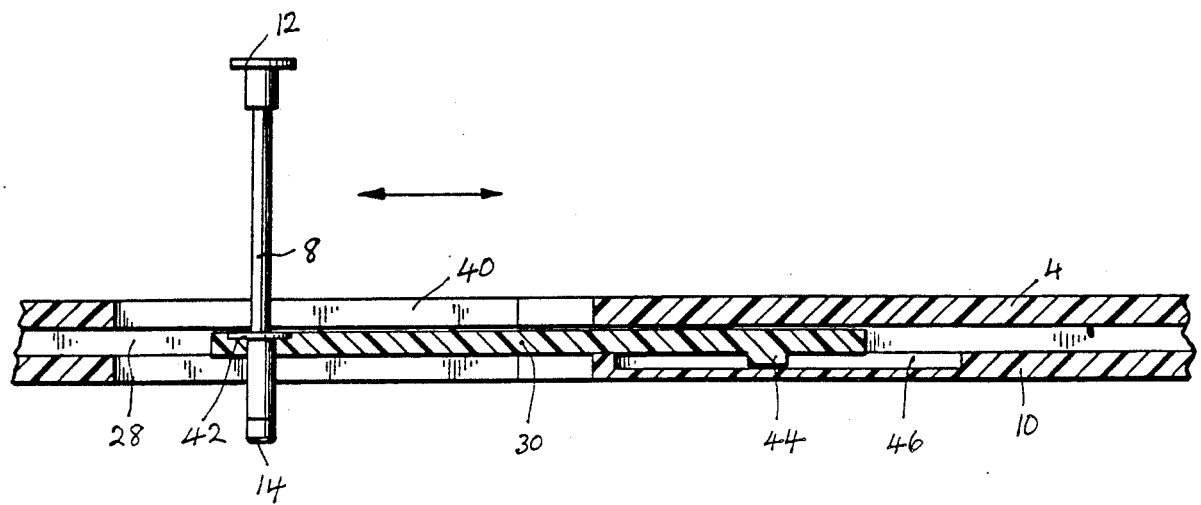
FIG. 5 is a sectional view taken on line 5—5 of FIG. 1.

With reference to FIGS. 4 and 5, the manner in which pins (marked Nos. 1 through 5) move is shown in FIG. 4. Each pin 8 is inserted through disc 26 which moves in space 28 between top plate 4 and bottom plate 10. Horizontal movement of each pin 8 (marked Nos. 1 through 5) is limited to its slot 16, 18, 20, 22 or 24, respectively. Each pin may be secured to its disc and/or guard adhesively or in any other appropriate manner.

FIG. 5 shows a pin 8 (such as pins marked Nos. 6 through 12) secured into strip 30, in any suitable way, such as by adhesive. Pin 8 may optionally have a collar 42 which ensures that pin 8 remains vertically oriented, perpendicular to the plane of strip 30. Strip 30 has knob 44 extending therefrom, either at one end or at an appropriate intermediate position, and knob 44 rides in elongated groove 46 which is formed in the upper surface of lower plate 10. Thus a pin 8 which extends from a strip 30 has a wide range of lateral movement so that the pin may be positioned as required. While FIG. 5 illustrates knob 44 extending downward from strip 30 into elongated groove 46 formed on the upper surface of lower plate 10, knob 44 may alternatively extend upward from strip 30 into an elongated groove in the lower surface on top plate 4, or the groove may be a slot of similar dimensions extending through lower plate 10.

Horizontal movement of each pin 8 (marked Nos. 6 through 12) is limited by the length of each strip 30, by the position of knob 44 on strip 30, by the orientation and length of groove (or slot) 46, and by the shape of the aperture 32, 34, 36, 38 and 40, through which the pins pass. Each aperture 32, 34, 36, 38 and 40 is illustrated as substantially four-sided, but other appropriate shapes will be apparent to one skilled in the art. The freedom of movement of the pins should be such that hands of as wide a range of sizes as possible may be measured using the apparatus. Other shapes for the apertures may be used. For example, apertures 34 and 36 may be combined into a single aperture in which pins marked Nos. 9 and 10 move.

FIGS. 6 to 8 show extending scale 48 for measuring the thickness of a hand. In using this device, apparatus 2 is placed having plates 4 and 10 standing vertically. Horizontal bar 52 is extended to expose scale 50, and the user positions the hand being measured with the thumb adjacent scale 50. Horizontal bar 52 is closed down on top of the hand across the knuckles. As seen in FIG. 7, bar 52 crosses the hand, having the thumb close up to the first finger so that the muscles of the thumb and hand are in their most prominent position. With the hand so placed, horizontal bar 52 is positioned across the hand, substantially over the knuckles. The height of the hand being measured is read from scale 50.

Extending scale 48 is appropriately made from rigid plastic sheet material and may be attached to the lower surface of bottom 10 of apparatus 2. Extending scale 48 has knob 54 protruding therefrom. Knob 54 is retained in slot 56 in sheet portion 58 which is adhered to bottom plate 10 by means of an intermediate filler strip 60. Alternatively, scale 48 may be loose, or attached to the apparatus by a chain, instead of being fastened to a face of the apparatus.

Apparatus 2 stands on feet 62, appropriately positioned for stability. Filler strips 64 separate top plate 4 and bottom plate 10 for allowing the strips and discs from which the pins extend to move smoothly in the space between the top and bottom plates.

Figure 10:
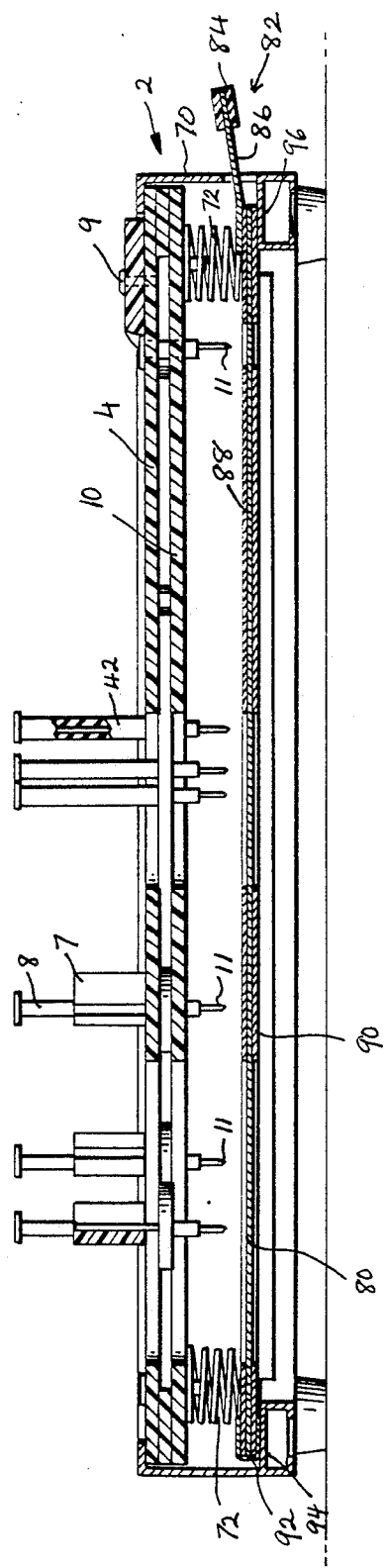
FIG. 10 is a sectional view taken on line 10—10 of FIG. 9.
Figure 11:
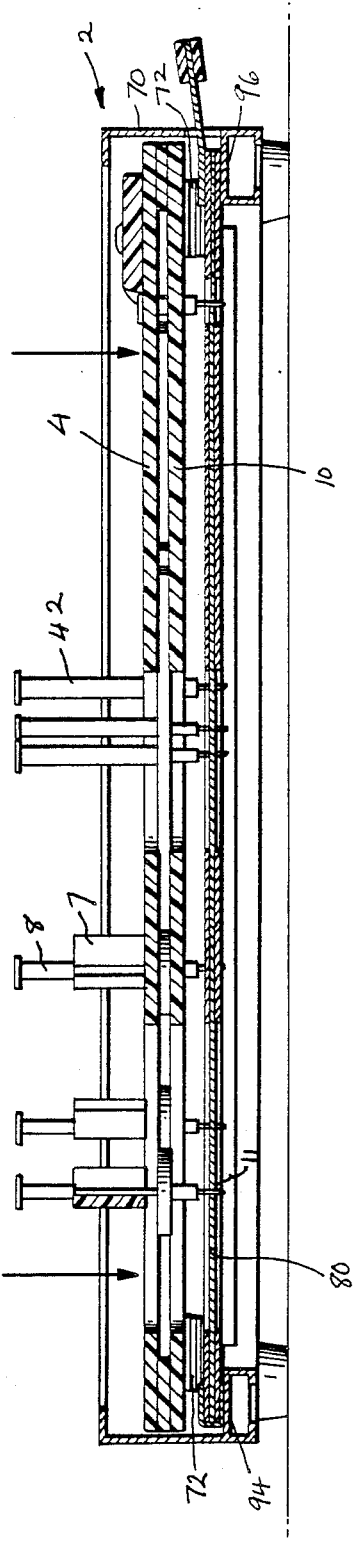
FIG. 11 is a sectional view, similar to FIG. 10, showing the pins marking through the recording sheet.

FIGS. 9 to 11 show another embodiment of hand measurement apparatus 2, similar to that shown in FIGS. 1 to 8, but using a different system for recording the locations of the pins.

According to the apparatus of FIGS. 9 to 11, apparatus 2 fits into frame 70, which extends around the perimeter of plates 4 and 10. Springs 72 support plates 4 and 10 at each corner. Pins 8 (marked Nos. 1–12) and pin 9 (optionally marked No. 13) each have a pointed tip 11 extending through top plate 4 and bottom plate 10 to mark the positions of the pins on the sheet below. When the plates are pushed downwardly, springs 72 are compressed and the pointed tips 11 of the pins are pressed through sheet 80 and then released. Sheet 80 is thus marked with pin holes according to the size of the hand being measured.

In an alternative embodiment additional pins may be used to fix the width of the wrist. Such pins would move in slots substantially parallel with the edge of strip 15 to hold the hand in position for measurement.

Sheet 80 is held in position in holder 82 having edge 84 which is gripped by the user to insert and withdraw holder 82. Edge 84 is attached by portion 86 to top sheet holder 88. Top sheet holder 88 is attached to bottom sheet holder 90 by hinge 92 or other appropriate means, as required. Top and bottom sheet holders 88 and 90, respectively, are substantially the same size as top and bottom plates 4 and 10. Sheet 80 is held by sheet holders 88 and 90, each of which has cut-out portions of similar size and position to those on top and bottom plates 4 and 10.

In use, the user grasps edge 84 and pulls holder 82 out of frame 70. A fresh sheet of relatively thick paper 80 is placed between sheet holders 88 and 90 and holder 82 is reinserted into frame 70 where it rests on supports 94 and 96 which are appropriately placed inside the perimeter of the frame.

For measuring, the hand to be measured is placed on the surface of the top plate and the pins are moved into the locations indicated above. In one method for recording the positions of the pins, using the apparatus shown in FIGS. 9 to 11, the plates 4 and 10 are spring loaded into frame 70 by means of springs 72. When the pins are in position, the plates are pushed down until the lower ends of the pins, which are preferably pointed, are pressed into a sheet of paper held in a frame below the plates, to indicate the pin locations. The sheet of paper also allows space for recording the name and address of the person whose hand is measured. When the pins have pierced the sheet, holder 82 is withdrawn and the sheet removed and sent away for the customized glove to be made.

A device using a cam or other appropriate means may alternatively be employed for moving the pins into marking contact with the sheet. It will be apparent to one skilled in the art that either the upper plate may be moved downward for the pins to mark the sheet, or the sheet holding structure may be moved upward to contact the pins.

In another alternative method for recording the location of the pins, the hand measurement apparatus, such as that shown in FIGS. 1 to 5, may be placed on a photocopying machine, with the hand still in place, and a photocopy may be made to record the exact location of the pins. Using this method, the pins each have white paint (or other indicator) on the bottom surface 14 of the pin, and the position of the pins is clearly recorded on a sheet of paper by the photocopying machine. Alternatively, the hand may be carefully removed from the device, without altering the position of the pins, before recording these positions using the photocopying machine. Care must be taken not to move the pin positions.

A form may be attached to the bottom of apparatus 2 at an appropriate height, having spaces for recording the name, address, hand height measured by scale 50, and other pertinent data relating to the person being fitted for the glove. This form will be reproduced on the photocopy together with the marker locations, and may be completed after photocopying.

Using the apparatus described, and either pointed or white-tipped pins, measurements for a custom-sized glove may be recorded on a single sheet of paper and mailed to the dealer or manufacturer, together with alternative means for recording the locations of the pins may be used.

Other position locating devices and methods may be used in place of the pins and methods described, and such locating devices and methods will be apparent to one skilled in the art. Other sizes, directions and positions for the slots and pins are also within the scope of the invention.

The figures illustrate apparatus for measuring a right hand. Apparatus for measuring a left hand is a mirror image of that shown. Users of sport gloves may often only need a single glove, but in custom fitting of driving gloves or dress gloves, both hands must be measured individually, and even if the hands of a person are significantly different from each other, a "pair" of gloves may be made to fit. The hand measurement apparatus of the invention may be sized for an adult's hand or child's hand as well as for left or right hands. For many users only one hand need be measured, and a mirror image of the measurement recording sheet may be used for sizing a glove for the other hand.

While the invention has been described above with respect to certain embodiments thereof, it will be appeciated that variations and modifications may be made without departing from the spirit and scope of the invention.

What is claimed is:

1. Apparatus for measuring dimensions of a human hand having a back portion, a palm portion, fingers and a thumb, said apparatus comprising:
   plate means for supporting an outstretched hand,
   a plurality of movable locator means for measuring finger length, extending through the plate means,
   a plurality of movable locator means for measuring the width of the base of at least one finger, extending through the plate means, and
   means on the locator means for recording the positions of said locator means on the surface of a sheet.

2. Apparatus of claim 1 wherein the position of the locator means is visible above the plate means.

3. Apparatus claim 1 wherein the position of the locator means is visible below the plate means.

4. Apparatus claim 1 wherein the locator means move in apertures through the plate means.

5. Apparatus of claim 1 wherein the locator means comprises means for locating tips of each finger and the thumb.

6. Apparatus of claim 1 wherein the locator means comprises means for locating positions between adjacent fingers and between the thumb and first finger.

7. Apparatus of claim 6 wherein the locator means comprises means for locating points on the outer sides of the thumb, first and fourth fingers.

8. Apparatus of claim 4 wherein the locator means move on guide means for limiting the movement of the locator means.

9. Apparatus of claim 8 wherein the plate means comprises a top plate spaced apart from a bottom plate and the guide means are located between the spaced apart top plate and bottom plate.

10. Apparatus of claim 9 wherein a portion of a guide means is engaged in groove means in one of said plates for limiting movement of locator means attached to said guide means.

11. Apparatus of claim 5 wherein the means for locating ends of the thumb and fingers move in elongated slots.

12. Apparatus of claim 6 wherein the means for locating positions where the fingers join the hand are each connected to a guide means having a portion engaged in groove means for limiting movement of the locator means, each of said locator means extending through the same aperture through the plate means.

13. Apparatus of claim 7 wherein the means for locating points on the outer sides of the thumb, first and fourth fingers is each attached to a guide means.

14. Apparatus of claim 13 wherein each locator means extends through a separate aperture through the plate means.

15. Apparatus of claim 1 further comprising scale means for measuring substantially the maximum thickness of the hand.

16. Apparatus of claim 5 wherein the scale means movably extends from one side of the apparatus.

17. Apparatus of claim 1 further comprising a sheet positioned in the apparatus for marking by the recording means.

18. A method for obtaining dimensions of a human hand having a plurality of fingers and a thumb, comprising:
  positioning the hand on a surface of an apparatus;
  positioning markers at ends of the fingers and thumb;
  positioning further markers at angles formed between pairs of adjacent fingers;
  positioning a marker at the angle formed between the first finger and thumb;
  positioning other markers on the outer sides of the thumb, first finger and fourth finger; and
  recording the position of each of said markers.

19. A method of claim 18 further comprising measuring the thickness of the hand by extending a calibrated scale to span across the top of the hand in the direction of maximum thickness of the hand, and quantitatively recording the extension of the scale.

* * * * *